United States Patent [19]

Swindler

[11] Patent Number: 5,424,913

[45] Date of Patent: Jun. 13, 1995

[54] HEAT SINK/COMPONENT ACCESS DOOR FOR PORTABLE COMPUTERS

[75] Inventor: Dan Swindler, Austin, Tex.

[73] Assignee: Dell USA, L.P., Austin, Tex.

[21] Appl. No.: 179,807

[22] Filed: Jan. 11, 1994

[51] Int. Cl.⁶ ............................................. H05H 7/20
[52] U.S. Cl. .................................. 361/687; 361/690; 361/707
[58] Field of Search .................. 361/683, 686–693, 361/704, 707–711, 715–722, 724

[56] References Cited

U.S. PATENT DOCUMENTS

| | | | |
|---|---|---|---|
| 3,909,679 | 9/1975 | Petri | 361/709 |
| 5,124,887 | 6/1992 | Kobayashi | 361/683 |
| 5,132,874 | 7/1992 | Chandler et al. | 361/390 |
| 5,138,523 | 8/1992 | Benck et al. | 361/687 |
| 5,159,534 | 10/1992 | Hudson et al. | 361/716 |
| 5,198,965 | 3/1993 | Curtis et al. | 361/687 |

*Primary Examiner*—Gregory D. Thompson
*Attorney, Agent, or Firm*—David Hitt; James Huffman

[57] ABSTRACT

Disclosed is an access door for computer systems comprising an outer case containing an electronic component of the computer system that is capable of generating heat during the operation of the computer system. The outer case has an aperture in its surface proximate the component to allow external access into the outer case. The access door is capable of assuming a closed position where it closes the aperture, covers the component and forms a part of the outer. The access door is also capable of being placed in an open position wherein the component is externally exposed through the aperture. The access door includes a heat sink having a heat receiving portion positioned to mechanically contact a surface of the component to allow transmission of heat from the component to the heat receiving portion. The heat sink further includes a heat dissipating portion forming an outer surface of the access door that is capable of dissipating heat received from the component via the heat receiving portion into an environment surrounding the computer system. The door thereby cools the component when in the closed position and allows access to the component when in the open position.

31 Claims, 4 Drawing Sheets

HEAT SINK/COMPONENT ACCESS DOOR FOR PORTABLE COMPUTERS

TECHNICAL FIELD OF THE INVENTION

The present invention is directed, in general, to a cooling apparatus for computer systems and, more specifically, to a heat sink proximate heat-producing component within the computer system that is removable to allow external access to the component.

BACKGROUND OF THE INVENTION

As computer systems grow in speed and shrink in size, power consumed within the computer per unit volume (power density) increases drastically. Thus, it becomes evermore important to dissipate the heat generated by components within the computer during their operation to ensure that the components remain within their normal operating temperature ranges to prevent the components from failing immediately or from having too short a lifetime.

In very early desktop personal computers, components were passively cooled by radiation or convection, the surfaces of the components themselves interfacing directly with still or convecting air surrounding the component to transfer heat thereto. Unfortunately, air is not a particularly good conductor of heat. In these early desktop computers, if the heated air had nowhere to go, it clung to the component, acting as a thermal insulator of sorts and increasing operating temperatures. Eventually computers were provided with fans to actively move air over the surfaces of the components, increasing temperature differential between the surfaces of the components and the surrounding air to increase efficiency of heat transfer. The increased temperature differential overcame some of the poor heat conductor qualities of air.

In portable computers (and, in particular, notebook computers), the problem of heat dissipation is even more pronounced, due in principal part to the confines of the size of such computers. Even though such computers make use of low power complementary metal oxide semiconductor ("CMOS") components (to conserve battery power) that dissipate somewhat less heat than higher power components, these CMOS components are nonetheless placed close together, exacerbating the problem of dissipating heat.

Of all components in a portable computer, the microprocessor central processing unit ("CPU") generates the most heat during operation of the computer. This is a result of its role as the electrical center of attention in the computer. Thus, in prior art portable computers, the CPU was placed close to the outer case to allow the outer case to transfer heat from the CPU to the environment outside the computer.

As new generations of microprocessors have arrived, however, this relatively simple scheme has become decidedly inadequate, risking destruction of the CPU by overheating. Due to power, space and circulation limitations inherent in portable computers (as opposed to desktop computers), it is impractical to fan-cool the components.

Some portable computers provide an access door proximate the CPU to allow external access to the CPU by a user or technician for purposes of conveniently testing or upgrading the CPU during the life of the computer. In these computers, the door is typically composed of plastic of same or similar type as the remainder of the outer case. An interior surface of the door is separated a small distance from the component for clearance purposes. Thus, heat transfer takes place from the component, through the air separating the component from the door, through the door and into the environment.

What is needed in the art is a more effective way of cooling the microprocessor or other heat-producing components in a portable computer. It is important that external access to the microprocessor not be compromised.

SUMMARY OF THE INVENTION

It is therefore a primary object of the present invention to integrate a heat sink into an access door to allow the access door to remove heat from an adjacent CPU (generically termed a "component," since the scope of the present invention includes providing access to, and cooling for, other, non-CPU electronic components) while it is operating, the door retaining an ability to pivot or translate away from the CPU to allow access to the CPU.

In the attainment of the above-described primary object, the present invention provides a combination heat sink/access door for a computer system. The computer system comprises an outer case containing an electronic component of the computer system, the component capable of generating heat during operation thereof, the outer case having an aperture in a surface thereof proximate the component to allow external access thereto.

The access door cooperates with the computer system, capable of assuming a closed position wherein the access door closes the aperture, covers the component and forms a part of the outer case and an open position wherein the component is externally exposed through the aperture. The access door includes (1) a heat sink having a heat receiving portion positioned to mechanically contact a surface of the component to allow transmission of heat from the component to the heat receiving portion and (2) a heat dissipating portion forming an outer surface of the access door and capable of dissipating heat received from the component via the heat receiving portion into an environment surrounding the computer system, the access door thereby cooling the component when in the closed position and allowing access to the component when in the open position. This allows the heat sink to provide a significant advantage: the ability to swing out of the way to allow external access to the component. It does not need to be removed from over the component.

"Upper surface," as the term is used herein, assumes that the microprocessor is mounted on a top side of the board. If the microprocessor is mounted on a bottom side of the board, the microprocessor is inverted and the "upper surface" of the microprocessor is actually below the "lower surface." CPUs typically have a lower surface that rests adjacent a mounting board and a substantially flat upper surface opposite the lower surface. The upper surface presents the best opportunity for heat removal, since it is not populated with pins, as is the lower surface or sides, and since it presents a relatively large planar surface area. Therefore, the heat receiving portion comprises a substantially flat surface conforming and corresponding to the upper surface of the component. A key advantage of this arrangement is that good thermal contact is maintained between the component and the heat sink, eliminating any layer of insulating air that would otherwise exist between the two. Elimination of the insulating layer of air increases thermal transfer capacity.

In a preferred embodiment, the heat dissipating portion comprises a plurality of externally projecting fins, the fins presenting a substantial heat-radiating surface to dissipate the heat into the environment. Thermal transfer capacity is also increased by virtue of the fins' existence.

A structure, to be described below in greater detail, is provided to retain the access door in the closed position. A structure is also provided within the access door for resiliently biasing the heat receiving portion against the surface of the component. The retaining structure and the biasing structure cooperate to hold the heat sink firmly against the component, further minimizing the occurrence of a layer of air between the two. Furthermore, the biasing structure allows the heat sink to move relative to the remainder of the access door, permitting the heat sink to seat firmly on the component even when the component is somewhat misaligned with respect to the outer case.

In one embodiment of the present invention, a compliant, thermally transmissible material is positioned between the heat receiving portion and the surface of the component to adjust for any irregularities or imperfections of fit between the heat sink and the surface. This, again, gives the advantage of providing a good interface for heat transfer between the component and the heat sink, particularly when either surface is not perfectly flat.

Finally, in a preferred environment of the present invention, the computer system is a notebook personal computer having a microprocessor located therein. The microprocessor is adjacent a bottom surface of the computer. In this environment, the access door/heat sink is located on the bottom of the computer, although it is readily apparent that other locations are equally valid and fall within the scope of the invention.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
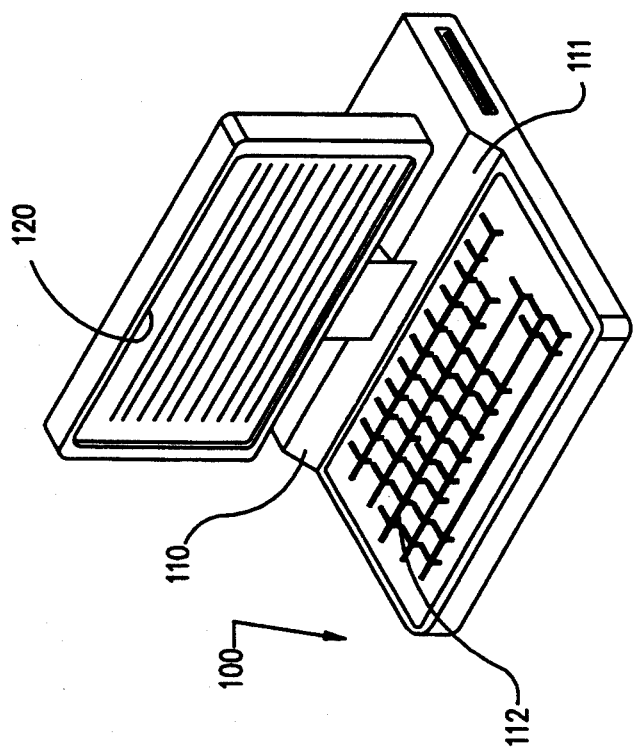
FIG. 1 illustrates an isometric view of a portable computer providing an environment in which the present invention operates.

FIG. 1 illustrates an isometric view of a portable computer, generally designated 100, providing an environment in which the present invention operates. The computer 100 comprises a lower half 110 and an upper half 120. The lower half 110 comprises an outer shell or chassis 111 that contains various, compactly-arranged electronic components of the computer 100 and a keyboard 112 allowing a user to transmit information to the computer 100. The chassis shields these components (not shown in FIG. 1 because they are internal to chassis 111, but detailed in pertinent part in FIG. 3) from damage by exposure to an environment external to the chassis 111. These components generate heat during operation of the computer due to ineffiencies in conducting electricity. As previously mentioned, this heat has, in the past, been transferred to the chassis 111 and into the surrounding environment. The chassis 111 has not, until now, contained any structure dedicated to and optimized for removing the heat. The upper half 120 contains a video screen or monitor 121 allowing the computer 100 to transmit information to the user.

The lower half 110 and the upper half 120 are hinged together so as to allow the lower half 110 and the upper half 120 to rotate relative to each other. This allows the computer 100 to assume a closed, storage position wherein the upper and lower halves 110, 120 shield the keyboard 112 and the monitor 121 from damage and wherein the computer 100 can be conveniently stored. The computer 100 can also assume (as shown) an open, operating position wherein the keyboard 112 and the monitor 121 are exposed to a user for communication therewith.

Figure 2:
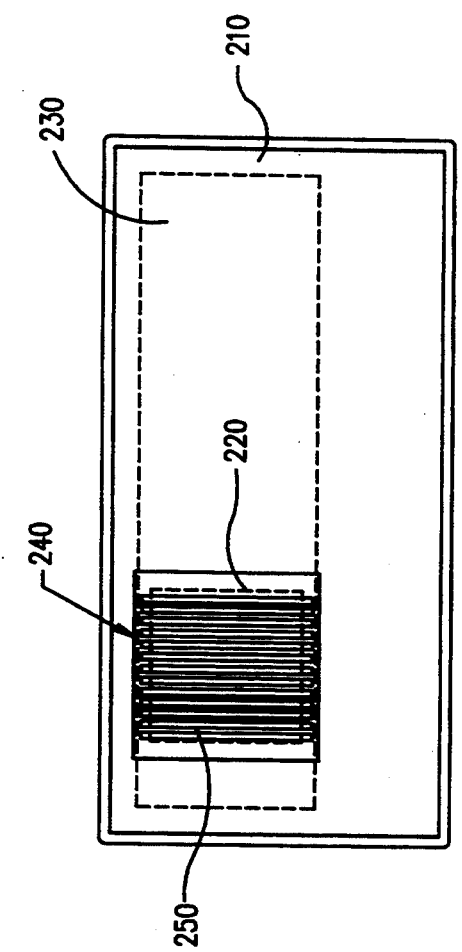
FIG. 2 illustrates a bottom view of the portable computer of FIG. 1 showing, in particular, the component heat sink/access door of the present invention.

Turning now to FIG. 2, illustrated is a bottom view of the portable computer 100 of FIG. 1 showing, in particular, the component heat sink/access door of the present invention. A lower surface 210 of the lower half 110 of the portable computer 100 is shown as having an aperture 220 therein. The aperture 220 exposes a component (not shown in FIG. 2) when removed from the lower surface 210. In a preferred embodiment of the present invention, the component is a microprocessor CPU. Shown in phantom line is a motherboard 230 containing various other electronic components that comprise the portable computer 100. A component heat sink/access door 240 covers the CPU and closes the aperture 220, sealing the outer shell of the portable computer while allowing selectable access to the CPU.

The door 240 includes a heat sink having an outer surface comprising a plurality of fins 250 (a heat dissipating portion). The fins 250 are of conventional design and form a large surface area from which to radiate heat generated by the CPU during operation. The heat sink is joined to a remainder of the door 240 in a manner to be described later to allow the heat sink to be removed from contact with the CPU when the door 240 is opened.

Figure 3:
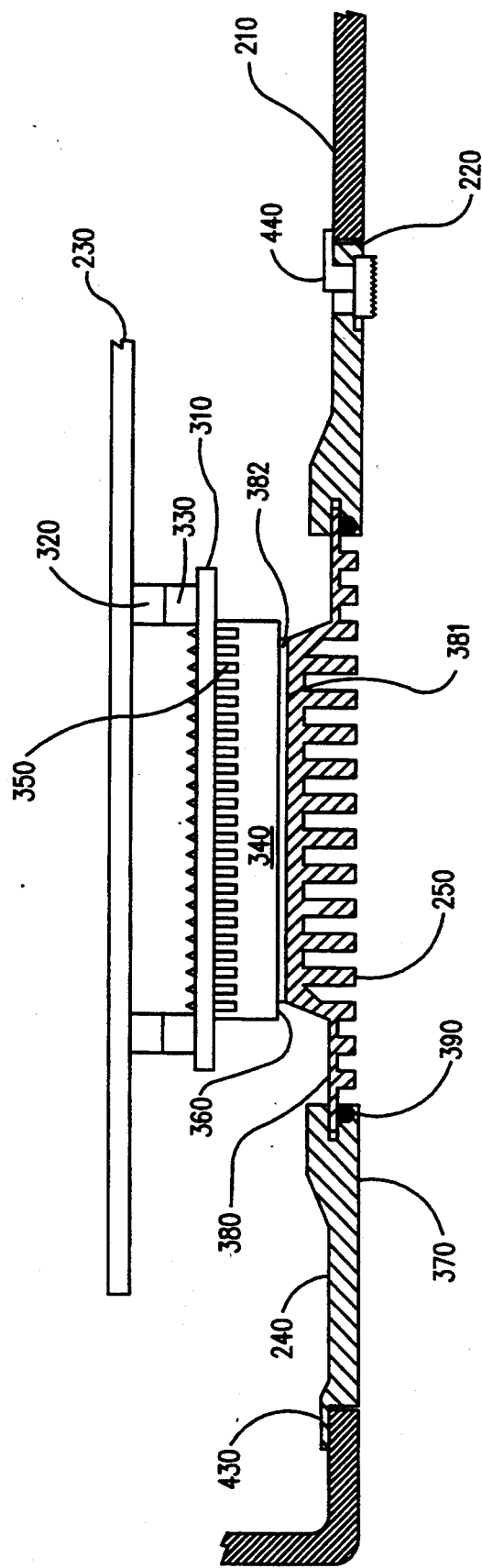
FIG. 3 illustrates a cross section of the component heat sink/access door of FIG. 2.

Turning now to FIG. 3, illustrated is a cross section of the component heat sink/access door 240 of FIG. 2. Shown are the lower surface 210, the aperture 220 and the motherboard 230 as described in FIG. 2. Also as described in FIG. 2, the door 240 includes an outer surface comprising a plurality of heat-radiating fins 250. A daughterboard 310 is electrically and mechanically joined to the motherboard 230 by one or more electrical connectors 320, 330. The connectors 320, 330 permit the daughterboard 310 to be removed from the motherboard 230 to allow for changes in CPU 340 pin configuration or to minimize space requirements on the motherboard 230 by the CPU 340. The CPU 340 is coupled to the daughterboard 310 by an electrical connector 350, permitting the CPU 340 to be removed from the daughterboard 310. The CPU 340 has an upper surface 360 that radiates heat during operation of the CPU 340. It is to this upper surface 360 that the present invention thermally couples.

Those skilled in the art should understand that the motherboard/daughterboard arrangement shown in FIG. 3 is purely environmental and forms no part of the present invention. Thus, the CPU 340 can be socket or permanently mounted directly on the motherboard 230 or in some other, immaterial manner.

The door 240 comprises a peripheral portion 370 having surfaces designed to mate with, and fix the door 240 with respect to, the lower surface 210 when the door 240 is closed. The peripheral portion 370 captures and holds a heat sink 380 therein in a manner to be described in conjunction with FIG. 5. A plurality of springs 390 bias the heat sink 380 toward an inward position with respect to the lower surface 210 such that an inner surface 381 of the heat sink 380 (a heat receiving portion) is pressed against the upper surface 360 of the CPU 340 when the door 240 is closed. This feature ensures that the heat sink 380 enjoys good thermal contact with the CPU 340. Eliminating thermal insulation in the form of air between the CPU 340 and the heat sink 380 brings about more efficient heat transfer from the CPU 340 to the heat sink 380. In one embodiment of the present invention, a compliant, thermally conductive material 382, such as Chotherm, is bonded to the inner surface 381, allowing the compliant material to compensate for any variations in the planar surface of either the upper surface 360 or the inner surface 381.

Figure 4:
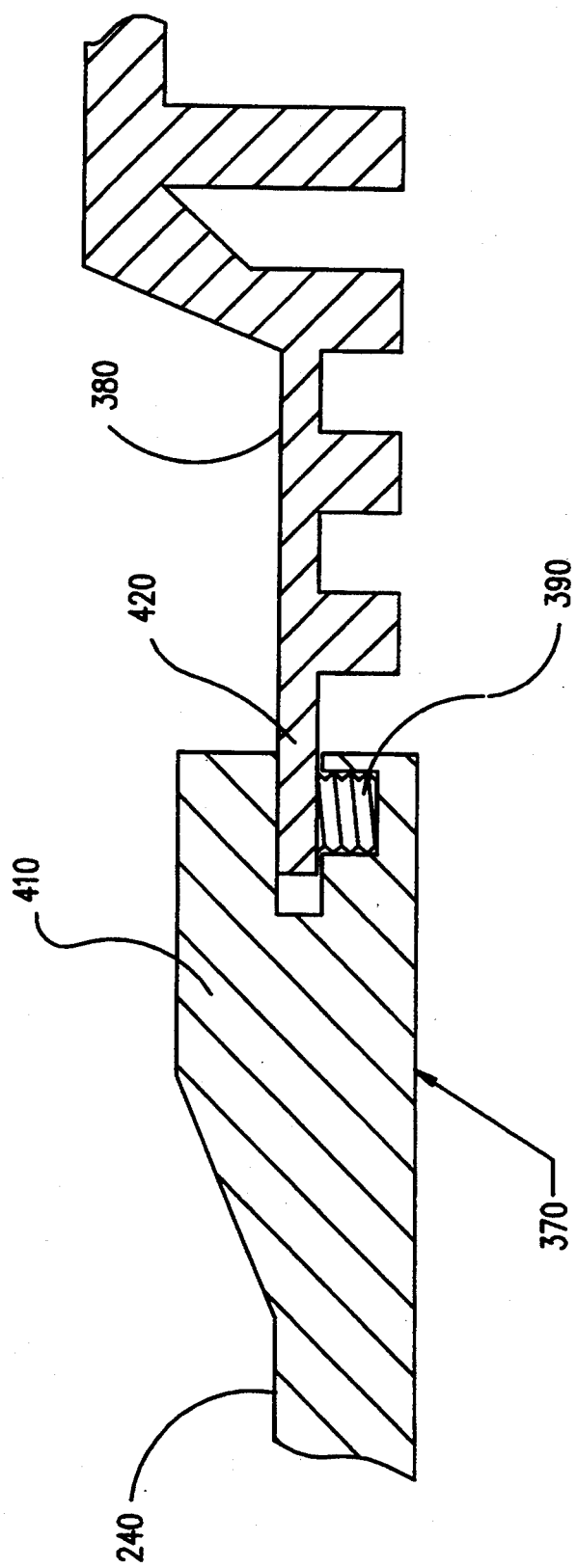
FIG. 4 illustrates an enlarged view of a portion of the component heat sink/access door of FIG. 3.

Turning now to FIG. 4, illustrated is an enlarged view of a portion of the component heat sink/access door 240 of FIG. 3. Shown are the lower surface 210, the peripheral portion 370, the heat sink 380 and a representative spring 390 employed to bias the heat sink 380 downward, as shown. The spring 390 is captured within a flanged portion 410 of the peripheral portion 370. A corresponding heat sink flange 420 extends to within the flanged portion 410 to mate with the spring 390. A mounting ledge 430 extends from the peripheral portion 370 and removably bears against an inside of the lower surface 210 to allow the door 240 to rotate outwardly for access to the component (not shown in FIG. 4). The spring 390 may be partially captured within a recess (not shown) molded into the peripheral portion 370, as design considerations may dictate.

Figure 5:
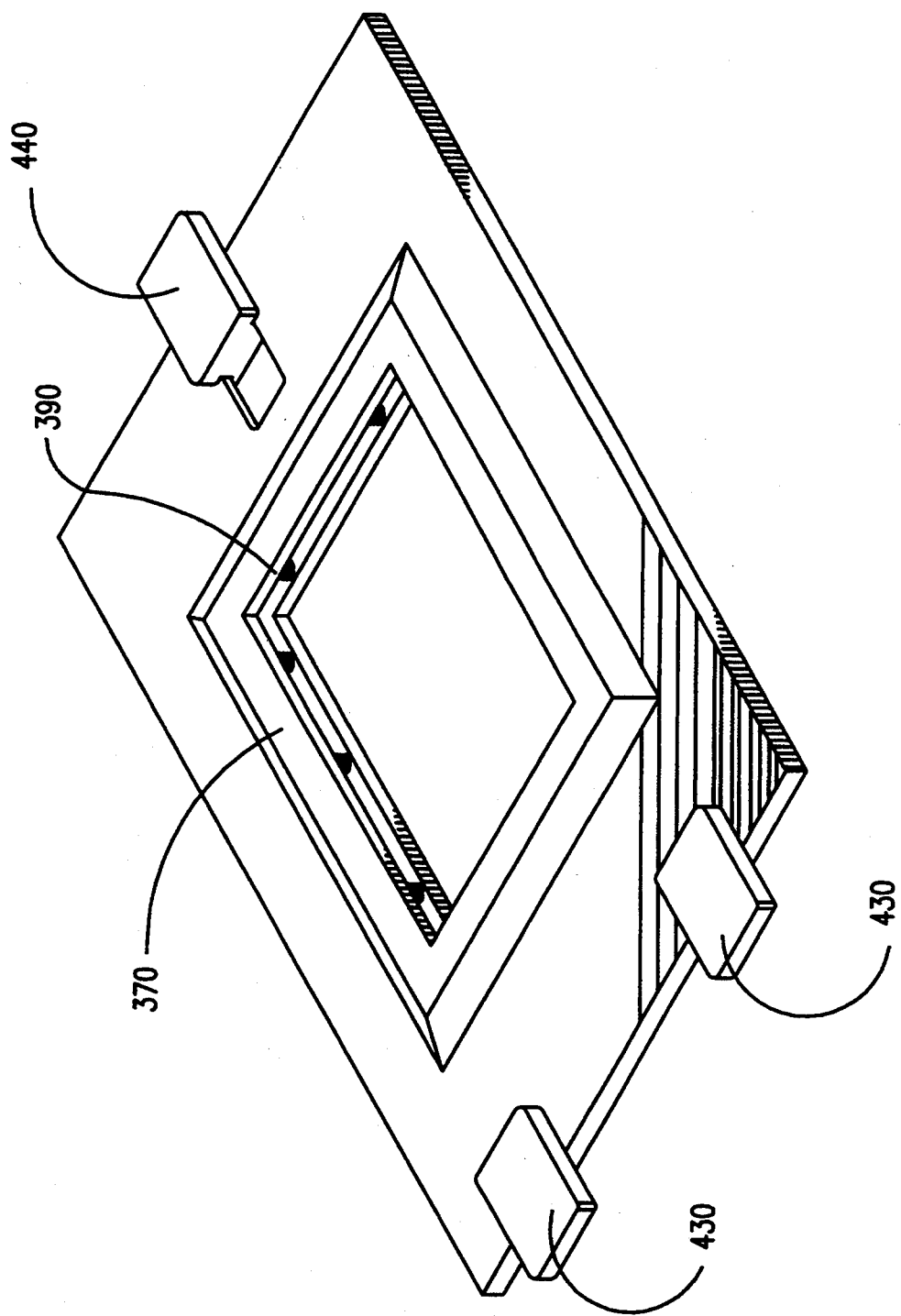
FIG. 5 illustrates an isometric view of a peripheral portion of the component heat sink/access door of the present invention.

Turning now to FIG. 5, illustrated is an isometric view of the peripheral portion 370 of the component heat sink/access door of the present invention. Shown are a pair of mounting ledges 430 and a latching mechanism 440. The mounting ledges 430 cooperate with the latching mechanism 440 and the lower surface 210 to allow the door 240 of FIG. 3 to be latched in a first, closed position and pivoted out from the lower surface into a second, open position for access to the CPU 340 of FIG. 3. Those skilled in the art should readily recognize that the mounting ledges 430 and the latching mechanism 440 comprise a conventional mechanism for mounting a door to a planar surface. Other such mechanisms are within the scope of the present invention, as long as they are sufficiently strong to counter the spring force produced by the springs 390.

From the above, it is apparent that the present invention discloses an access door for computer systems comprising an outer case containing an electronic component of the computer system, the component capable of generating heat during operation thereof, the outer case having an aperture in a surface thereof proximate the component to allow external access thereto. The access door is capable of assuming a closed position wherein the access door closes the aperture, covers the component and forms a part of the outer case and an open position wherein the component is externally exposed through the aperture, the access door including a heat sink having a heat receiving portion positioned to mechanically contact a surface of the component to allow transmission of heat from the component to the heat receiving portion, the heat sink further including a heat dissipating portion forming an outer surface of the access door and capable of dissipating heat received from the component via the heat receiving portion into an environment surrounding the computer system, the access door thereby cooling the component when in the closed position and allowing access to the component when in the open position.

Although the present invention and its advantages have been described in detail in the foregoing detailed description, those skilled in the art should understand that the detailed description is given by way of illustration only and that various changes, substitutions and alterations can be made herein without departing from the spirit and scope of the invention as defined and limited solely by the appended claims.

What is claimed is:

1. A computer system, comprising:
   an outer case containing an electronic component of said computer system, said component capable of generating heat during operation thereof, said outer case having an aperture in a surface thereof proximate said component to allow external access thereto; and
   an access door capable of assuming a closed position wherein said access door closes said aperture, covers said component and forms a part of said outer case and an open position wherein said component is externally exposed through said aperture, said access door including a heat sink having a heat receiving portion positioned to mechanically contact a surface of said component to allow transmission of heat from said component to said heat receiving portion, said heat sink further including a heat dissipating portion forming an outer surface of said access door and capable of dissipating heat received from said component via said heat receiving portion into an environment surrounding said computer system.

2. The computer as recited in claim 1 wherein said heat receiving portion comprises a substantially flat surface conforming and corresponding to said surface of said component.

3. The computer as recited in claim 1 wherein said heat dissipating portion comprises a plurality of externally projecting fins, said fins presenting a substantial heat-radiating surface to dissipate said heat into the environment.

4. The computer as recited in claim 1 further comprising means secured to said surface of said outer case for retaining said access door in said closed position.

5. The computer as recited in claim 1 wherein said heat receiving portion comprises a compliant, thermally transmissible material secured thereto between said heat receiving portion and said surface of said component.

6. The computer as recited in claim 1 further comprising means, located within said access door, for resiliently biasing said heat receiving portion against said surface of said component.

7. The computer as recited in claim 1 wherein said surface of said outer case is a bottom surface of said computer system.

8. A method of cooling and providing access to an electronic component within a computer system, comprising the steps of:
   translating an access door from an initial, open position wherein an aperture in a surface of an outer case of said computer system proximate said component exposes said component for external access thereto to a subsequent, closed position wherein said access door closes said aperture, covers said component and forms a part of said outer case;
   resiliently biasing a heat receiving portion of a heat sink within said access door against a surface of said component to allow transmission of heat from said component to said heat receiving portion; and
   transmitting said heat from said heat receiving portion to a heat dissipating portion of said heat sink forming an outer surface of said access door and capable of dissipating heat received from said component via said heat receiving portion into an environment surrounding said computer system, said access door thereby cooling said component when in said closed position and allowing access to said component when in said open position.

9. The method as recited in claim 8 wherein said heat receiving portion comprises a substantially flat surface conforming and corresponding to said surface of said component.

10. The method as recited in claim 8 wherein said heat dissipating portion comprises a plurality of externally projecting fins, said fins presenting a substantial heat-radiating surface to dissipate said heat into said environment.

11. The method as recited in claim 8 further comprising the step of retaining said access door in said closed position.

12. The method as recited in claim 8 wherein said heat receiving portion further comprises a compliant thermally transmissible material secured thereto between said heat receiving portion and said surface of said component and the method further comprises the step of receiving said heat from said surface of said component through said compliant, thermally transmissible material.

13. The method as recited in claim 8 wherein said surface of said outer case is a bottom surface of said computer system.

14. A portable computer, comprising:
   an outer case containing a central processing unit (CPU) of said portable computer, said CPU capable of generating heat during operation thereof, said outer case having an aperture in a surface thereof proximate said CPU to allow external access thereto; and
   an access door capable of assuming a closed position wherein said access door closes said aperture, covers said CPU and forms a part of said outer case and an open position wherein said CPU is externally exposed through said aperture, said access door including a heat sink extending through said access door, said heat sink having a substantially flat surface adapted to mechanically contact a corresponding substantially flat surface of said CPU to allow transmission of heat from said CPU to said substantially flat surface of said heat sink, said heat sink further including a plurality of heat dissipating fins forming an outer surface of said access door and capable of dissipating heat received from said CPU via said substantially flat surface of said heat sink into an environment surrounding said portable computer.

15. The computer as recited in claim 14 wherein said fins present a substantial heat-radiating surface to dissipate said heat into the environment.

16. The computer as recited in claim 14 further comprising means, secured to said surface of said outer case, for retaining said access door in said closed position.

17. The computer as recited in claim 14 wherein said substantially flat surface further comprises a compliant, thermally transmissible material secured to said substantially flat surface between said substantially flat surface of said heat sink and said surface of said CPU.

18. The computer as recited in claim 14 further comprising a plurality of springs located within said access door and capable of resiliently biasing said heat sink against said surface of said CPU.

19. The computer as recited in claim 14 wherein said surface of said outer case is a bottom surface of said portable computer.

20. A method of cooling and providing access to a central processing unit (CPU) within a portable computer, comprising the steps of:
   translating an access door from an initial, open position wherein an aperture in a surface of an outer case of said portable computer proximate said CPU exposes said CPU for external access thereto to a subsequent, closed position wherein said access door closes said aperture, covers said CPU and forms a part of said outer case;
   resiliently biasing, with a plurality of springs, a substantially flat surface of a heat sink secured to and extending through said access door against a corresponding, substantially flat surface of said CPU to allow transmission of heat from said CPU to said substantially flat surface of said heat sink; and
   transmitting said heat from said substantially flat surface of said heat sink to a plurality of heat dissipating fins forming an outer surface of said access door and capable of dissipating heat received from said CPU via said substantially flat surface of said heat sink into an environment surrounding said portable computer.

21. The method as recited in claim 20 wherein said fins present a substantial heat-radiating surface to dissipate said heat into the environment.

22. The method as recited in claim 20 further comprising the step of retaining said access door in said closed position.

23. The method as recited in claim 20 wherein said substantially flat surface further comprises a compliant, thermally transmissible material secured thereto and said method further comprises the step of receiving said heat from said surface of said CPU through said compliant, thermally transmissible material.

24. The method as recited in claim 20 wherein said surface of said outer case is a bottom surface of said portable computer.

25. A notebook personal computer, comprising:
an outer case containing a microprocessor of said computer, said microprocessor capable of generating heat during operation thereof, said outer case having an aperture in a surface thereof proximate said microprocessor to allow external access thereto;
an access door capable of assuming a closed position wherein said access door closes said aperture, covers said microprocessor and forms a part of said outer case and an open position wherein said microprocessor is externally exposed through said aperture, said access door including a metal heat sink extending through said access door, said heat sink having a substantially flat surface adapted to mechanically contact a corresponding substantially flat surface of said microprocessor to allow transmission of heat from said microprocessor to said substantially flat surface of said heat sink, said heat sink further including a plurality of heat dissipating fins forming an outer surface of said access door and capable of dissipating heat received from said microprocessor via said substantially flat surface of said heat sink into an environment surrounding said computer;
a latch coupled to said access door and capable of retaining said access door in said closed position; and
a plurality of springs located within said access door and capable of resiliently biasing said heat sink against said surface of said microprocessor.

26. The computer as recited in claim 25 wherein said substantially flat surface further comprises a compliant, thermally transmissible material secured to said substantially flat surface between said substantially flat surface of said heat sink and said surface of said microprocessor.

27. The computer as recited in claim 25 wherein said surface of said outer case is a bottom surface of said computer.

28. A method of cooling and providing access to a microprocessor within a notebook personal computer, comprising the steps of:
translating an access door from an initial, open position wherein an aperture in a surface of an outer case of said computer proximate said microprocessor exposes said microprocessor for external access thereto to a subsequent, closed position wherein said access door closes said aperture, covers said microprocessor and forms a part of said outer case;
resiliently biasing, with a plurality of springs, a substantially flat surface of a metal heat sink secured to and extending through said access door against a corresponding, substantially flat surface of said microprocessor to allow transmission of heat from said microprocessor to said substantially flat surface of said heat sink;
transmitting said heat from said substantially flat surface of said heat sink to a plurality of heat dissipating fins forming an outer surface of said access door and capable of dissipating heat received from said microprocessor via said substantially flat surface of said heat sink into an environment surrounding said computer; and
latching said access door in said closed position.

29. The method as recited in claim 28 wherein said fins presenting a substantial heat-radiating surface to dissipate said heat into said environment.

30. The method as recited in claim 28 wherein said substantially flat surface further comprises a compliant, thermally transmissible material secured thereto and the method further comprises the step of receiving said heat from said surface of said microprocessor through said compliant, thermally transmissible material.

31. The method as recited in claim 28 wherein said surface of said outer case is a bottom surface of said computer.

* * * * *